US012684405B2

(12) United States Patent
Han et al.

(10) Patent No.: US 12,684,405 B2
(45) Date of Patent: Jul. 14, 2026

(54) UPLINK IN-ORDER DELIVERY FOR QOS FLOW OFFLOADED IN 5GC MULTI-RAT DUAL CONNECTIVITY

(71) Applicant: Apple Inc., Cupertino, CA (US)

(72) Inventors: Jaemin Han, Portland, OR (US);
Yujian Zhang, Beijing (CN);
Alexander Sirotkin, Tel-Aviv (IL);
Sudeep K. Palat, Gloucestershire (GB)

(73) Assignee: Apple Inc., Cupertino, CA (US)

( * ) Notice: Subject to any disclaimer, the term of this patent is extended or adjusted under 35 U.S.C. 154(b) by 829 days.

(21) Appl. No.: 17/276,468

(22) PCT Filed: Sep. 25, 2019

(86) PCT No.: PCT/US2019/052915
§ 371 (c)(1),
(2) Date: Mar. 15, 2021

(87) PCT Pub. No.: WO2020/068952
PCT Pub. Date: Apr. 2, 2020

(65) Prior Publication Data
US 2022/0038941 A1     Feb. 3, 2022

Related U.S. Application Data

(60) Provisional application No. 62/737,521, filed on Sep. 27, 2018.

(51) Int. Cl.
*H04W 80/08*         (2009.01)
*H04L 12/26*         (2006.01)
(Continued)

(52) U.S. Cl.
CPC ....... *H04W 28/0268* (2013.01); *H04W 76/12* (2018.02); *H04W 76/15* (2018.02)

(58) Field of Classification Search
None
See application file for complete search history.

(56) References Cited

U.S. PATENT DOCUMENTS 10,911,977 B2 *   2/2021   Agiwal .................. H04W 76/12
11,153,272 B2 *   10/2021  Yang ................... H04L 61/2592
(Continued)

FOREIGN PATENT DOCUMENTS

CN         103765955       4/2014
CN         104620664       5/2015
(Continued)

OTHER PUBLICATIONS

Ericsson; "Establishing a Second NG-U Tunnel for a PDU Session"; 3GPP TSG-RAN WG3, Meeting #101; R3-184970; Gothenborg, Sweden; Aug. 2018; 5 pgs.

(Continued)

*Primary Examiner* — Sithu Ko
(74) *Attorney, Agent, or Firm* — Kowert, Hood, Munyon, Rankin & Goetzel, P.C.

(57)         ABSTRACT

Systems and methods of providing uplink in-order packet delivery of a QoS flow offloaded in a 5G network are described. An uplink forwarding tunnel is established between a source and target node after a determination is made to offload a QoS flow of a UE to the target node. The source node receives a SDAP PDU from the UE that contains an end marker and, in response, sends a GTP-U end marker packet to the target node via the uplink forwarding tunnel. The target node buffer packets associated with the QoS flow received from the UE after establishment of the uplink forwarding tunnel until the GTP-U end marker packet is received from the target node via the uplink forwarding tunnel and, in response, sends the buffered packets to the 5GC.

20 Claims, 5 Drawing Sheets

(51) Int. Cl.

| | | |
|---|---|---|
| *H04W 28/02* | (2009.01) | |
| *H04W 76/12* | (2018.01) | |
| *H04W 76/15* | (2018.01) | |

(56) References Cited

U.S. PATENT DOCUMENTS

| | | | | |
|---|---|---|---|---|
| 11,190,968 | B2 * | 11/2021 | Ke | ......................... H04W 76/12 |
| 2013/0258963 | A1 | 10/2013 | Westberg | |
| 2017/0251514 | A1 | 8/2017 | Soderlund | |
| 2018/0234839 | A1 | 8/2018 | Tenny | |
| 2019/0313295 | A1 * | 10/2019 | Xu | ......................... H04W 88/10 |
| 2020/0112875 | A1 * | 4/2020 | Peng | ................. H04W 28/0268 |
| 2020/0120535 | A1 * | 4/2020 | Dai | ......................... H04W 76/27 |
| 2020/0205067 | A1 * | 6/2020 | Liu | ......................... H04W 16/18 |
| 2020/0280872 | A1 * | 9/2020 | Fiorani | ................. H04W 28/24 |
| 2021/0126991 | A1 * | 4/2021 | Huang | .................... H04L 69/22 |
| 2021/0153076 | A1 * | 5/2021 | Wang | ....................... H04L 61/00 |
| 2021/0185569 | A1 * | 6/2021 | Hu | .................... H04W 36/0022 |
| 2021/0266991 | A1 * | 8/2021 | Teyeb | ............... H04W 28/0268 |

FOREIGN PATENT DOCUMENTS

| | | |
|---|---|---|
| CN | 106664733 | 5/2017 |
| EP | 3813302 | 4/2021 |
| WO | 2017193402 | 11/2017 |
| WO | 2018110952 | 6/2018 |
| WO | 2018128529 | 7/2018 |

OTHER PUBLICATIONS

Zte Corporation; "Further Discussion on End Marker"; 3GPP TSG RAN WG3#ad-hoc1807; R3-183666; Montreal, Canada; Jul. 2018; 8 pgs.

OPPO; "The SDAP Supporting for MR-DC"; 3GPP TSG-RAN2, Meeting #103; R2-1811353; Gothenburg, Sweden; Aug. 2018; 5 pgs.

Extended European Search Report; Application No. 19866682.8; mailed Jan. 4, 2022; 9 pgs.

3GPP TS 38.423, V15.1.0, Technical Specification Group Radio Access Network; NG-RAN; Xn application protocol (XnAP), Release 15, Sep. 24, 2018, pp. 1-263.

3GPP TS 38.300, V15.3.0, Technical Specification Group Radio Access Network; NR; NR; and NG-RAN Overall Description; Stage 2, Release 15, Sep. 26, 2018, pp. 1-92.

International Search Report and Written Opinion of International Application No. PCT/US2019/052915, mailed Sep. 25, 2019, pp. 1-9.

Notice of Grant for CN Application No. 201980060565X; Jun. 2, 2024.

Office Action for EP 19866682.8; Oct. 8, 2025.

* cited by examiner

UPLINK IN-ORDER DELIVERY FOR QOS FLOW OFFLOADED IN 5GC MULTI-RAT DUAL CONNECTIVITY

This application is a U.S. National Stage filing of International Application No. PCT/US2019/052915, filed Sep. 25, 2019, titled "UPLINK IN-ORDER DELIVERY FOR QoS FLOW OFFLOADED IN 5GC MULTI-RAT DUAL CONNECTIVITY," which claims the benefit of priority to the U.S. Provisional Patent Application No. 62/737,521, filed Sep. 27, 2018, each of which is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to quality of service (QoS) flows in 5G systems.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system, 5G or NR, will provide ubiquitous connectivity and access to information, as well as ability to share data, by various users and applications. NR is expected to be a unified framework that targets to meet starkly different and sometimes, conflicting performance criteria and services. In general, NR will evolve based on 3GPP LTE-Advanced technology with additional enhanced radio access technologies (RATs) to enable seamless wireless connectivity solutions. Some of these solutions may involve offloading of packet flows between paths in a 5G network may be problematic for applications in which the packet order is to be retained.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
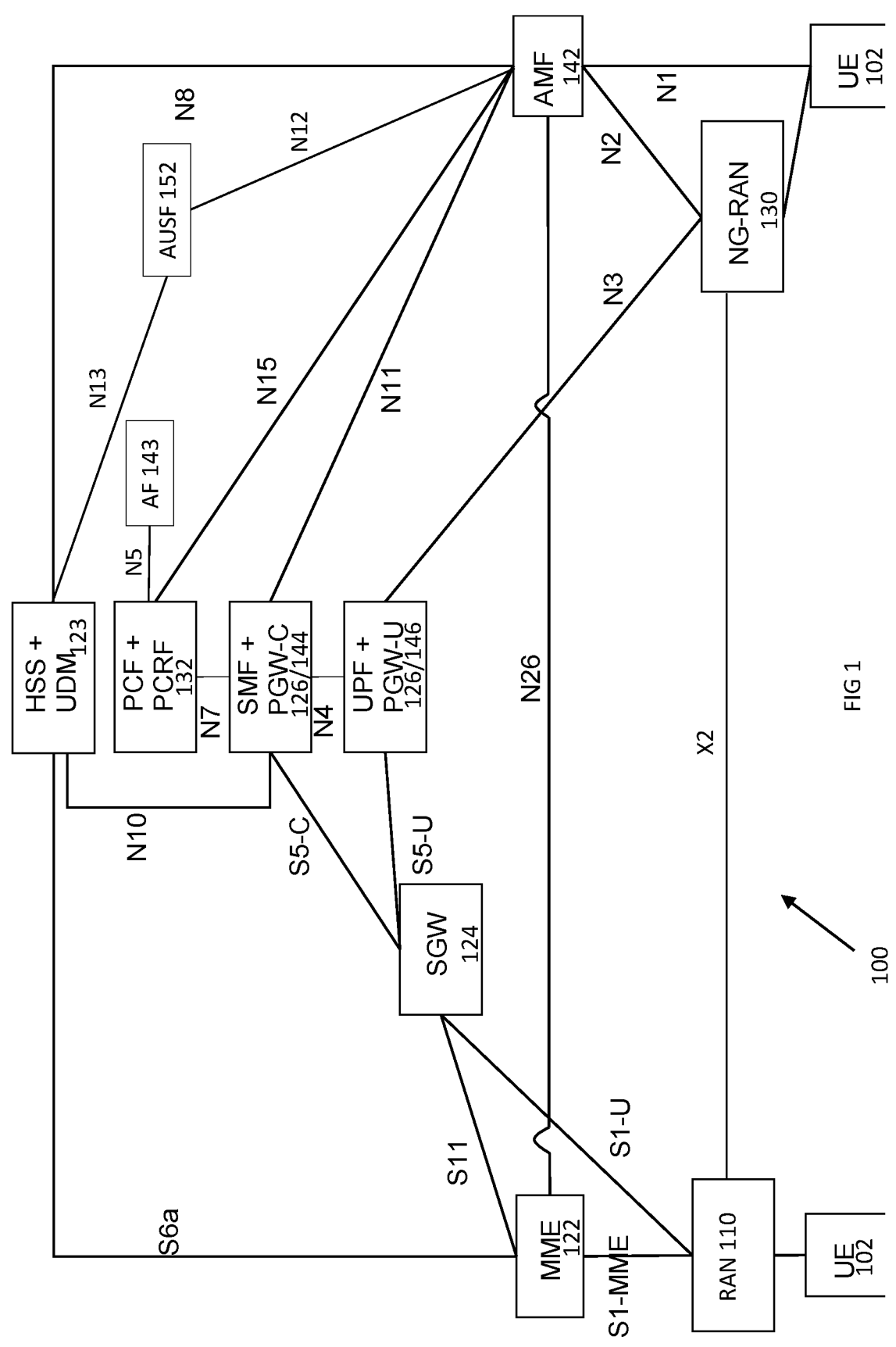
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 146 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
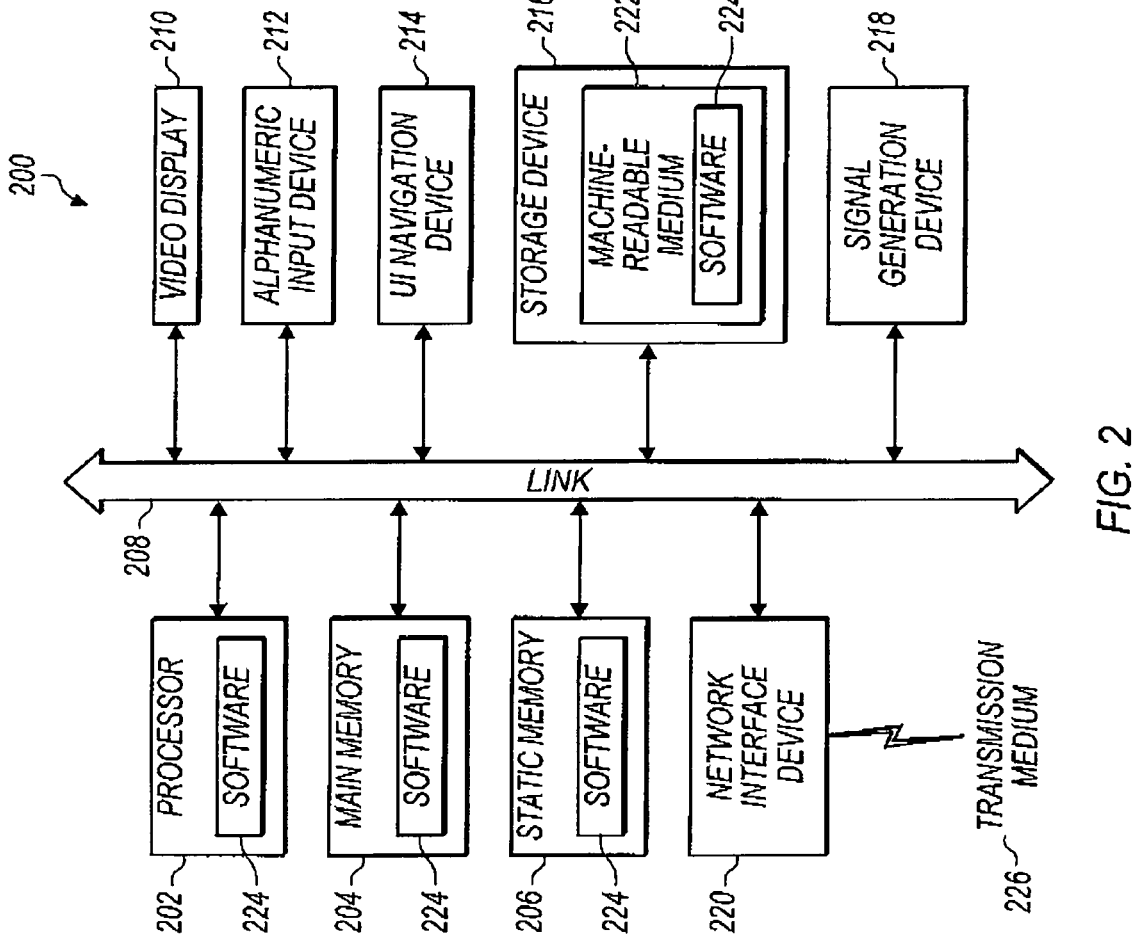
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, the 5G core network (5GC) may include functions such as the AMF, SMF, PCF and AF shown in FIG. 1, among others. Some UEs may have the ability of Multi-RAT Dual Connectivity (MR-DC), allowing connection to both a master node (MN) and a secondary node (SN) using the same RAT or different RATs. The master and secondary nodes, which may be connected via non-ideal or ideal backhaul. MR-DC may be used in a non-standalone deployment to enable the UE to use radio resources provided by different schedulers in the master and secondary nodes, for E-UTRA access (via one of the nodes) and NR access (via the other of the nodes).

As indicated, the NR system may use QoS flows. One or more Service Data Flows (SDFs) can be transported in the same QoS flow, if they share the same policy and charging rules. In the 5GC, the UPF may provide transport of data between the gNB and the 5GC. In NR system, there is a one-to-many relationship between the General Packet Radio Service (GPRS) Tunneling Protocol (GTP)-U tunnel on the N3 interface and the data radio bearers (DRBs) on the air interface. Each QoS flow on the N3 interface may be mapped to a single GTP-U tunnel. The gNB may map individual QoS flows to one more DRBs. A PDU session may thus contain multiple QoS flows and several DRBs but only a single N3 GTP-U tunnel. A DRB may transport one or more QoS flows. The QoS Flow Identifier (QFI) that identifies the QoS flow may be carried in an extension header on the N3 interface in the GTP-U protocol, using uplink and downlink PDU session information frames. The uplink and downlink PDU session information frame may include a QFI field for each PDU. The downlink PDU session information frame may include a Reflective QoS Indicator (RQI) field to indicate whether the user plane reflective QoS is to be activated or not.

In some situations, such as when one or more nodes are added to the 5G network, the 5GC may determine that a particular QoS flow to the UE should be offloaded between the master node and secondary node (either from the master node to the secondary node or from the secondary node to the master node). When the QoS flow is offloaded, the QoS flow may be remapped from one DRB to a different DRB.

Due to the change of nodes, packet delivery may become disordered. For remapping within the same gNB, guaranteeing in-order delivery for a QoS flow, the end-marker Service Data Adaptation Protocol (SDAP) packet data unit (PDU) has been specified in 3GPP TS 37.324 for the uplink direction, whereas the downlink direction is left up to network implementation. For a QoS flow offloaded to a different node in the downlink direction, in-order delivery may similarly be left up to the network implementation. This may be similar to remapping in the same node because the source node (either the master node or the secondary node that initiates offloading) can initiate forwarding to the target node via a downlink forwarding tunnel. The downlink tunnel may be established during an offloading procedure that is similar to a handover procedure. The remapping can be initiated once the last QoS packet to be offloaded has been successfully delivered on the source node side.

Figure 3:
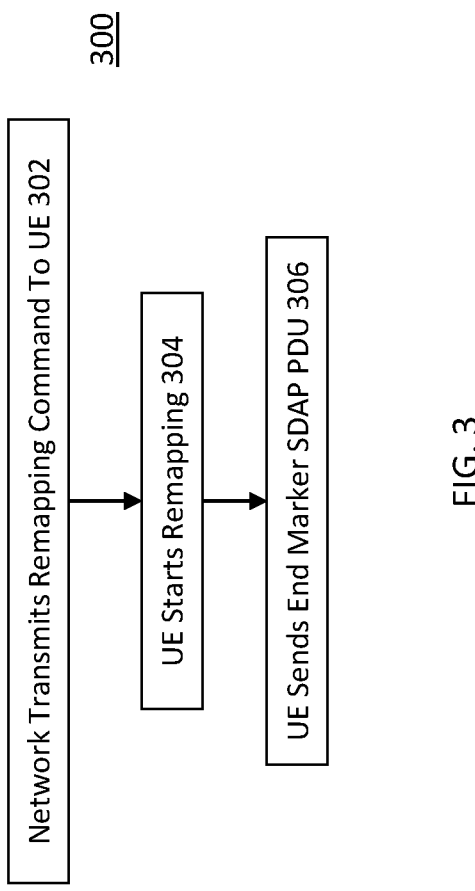
FIG. 3 illustrates an example of QoS offloading in the uplink direction in accordance with some embodiments.

QoS flow offloading in the uplink direction may, however, be enhanced. FIG. 3 illustrates an example of QoS offloading in the uplink direction in accordance with some embodiments. FIG. 3 may illustrate only some of the operations involved in offloading in the uplink direction; other operations may be used, but are not shown for convenience. As shown, the QoS offloading procedure 300 may be initiated at the UE when the UE receives a remapping command from the network at operation 302. The network command may be delivered, for example, via a radio resource control (RRC) message. In other embodiments, for each DRB, the UE may monitor the QoS flow ID(s) of the downlink packets and apply the same mapping in the uplink direction; that is, for a particular DRB, the UE may map the uplink packets belonging to the QoS flows(s) corresponding to the QoS flow ID(s) and PDU Session observed in the downlink packets for that DRB.

As the network controls remapping, the UE may be unable to wait for in-order PDU delivery as the network does during downlink remapping. The UE may thus initiate remapping at operation 304.

In response to initiating the remapping, at operation 306, the UE can send an end marker SDAP PDU using the old DRB when remapping starts. This may occur when the old DRB was a default DRB or when the old DRB was configured with the presence of SDAP header according to 3GPP TS 37.324. Currently there is, however, no mechanism specified between the master node and the secondary node on how to handle the end marker for the uplink direction. Moreover, nothing has yet been specified regarding the uplink QoS flow forwarding from the source node to the target node. For example, forwarding the end marker to the target node is not able to be realized. Thus, in-order delivery of the uplink PDUs is unable to be achieved from the target side (unlike in the downlink direction). One reason for this may be that uplink QoS flow forwarding was not specified during the handover process. As a result, out-of-order delivery may occur for the uplink direction, even if the source node wants to deliver in-order when offloading a QoS flow to another node.

To overcome this issue, in some embodiments, the network may configure the UE, e.g., in the remapping command in operation 302, to wait for successful delivery of the last QoS packet in the old DRB before starting remapping to the new DRB. The remapping command may be provided from the source node in an RRC reconfiguration message that includes an indicator to initiate the UE remapping.

Alternatively, or in addition, an SDAP PDU header may include the indicator if reflective mapping is used. In this case, the SDAP PDU may be modified to include an additional octet as the SDAP PDU header at present does not contain any spare bits. Successful delivery of the last QoS packet in the old DRB may be indicated, for example, by an ACK packet from the source node to the UE. This may, in some cases however, result in a service interruption during remapping.

In some embodiments, the target node may buffer the offloaded uplink QoS flows. In this case, the source node may send to the target node a go-ahead indication to forward the buffered PDUs to the UPF. The end-marker SDAP PDU may be sent in the old DRB when remapping occurs so that the source node can know when to indicate reception of the final PDU toward the target node. Such indication may occur without the use of an uplink forwarding tunnel from the source node to the target node. As there may be no forwarding from the source node to the target node, this methodology may rely on XnAP signaling to provide the indication. During offloading preparation, the source node and the target node may differentiate whether to guarantee uplink in-order deliver for an offloaded QoS flow so that the target node can properly buffer the offloaded QoS flows received from the UE until indicated over the XnAP interface.

In some embodiments, the source node may mark the end of the uplink QoS flow stream for the UPF. This may allow the UPF to handle in-order delivery between QoS flows (with the same QFI) sent by both the source node and the target node. The UPF may buffer the (offloaded) uplink QoS flows from the target node until the UPF receives the end marker of the uplink QoS flow stream (over the NG-U tunnel) from the source node. This may be accomplished via the existing end-marker packet defined in the 3GPP TS forwarded uplink QoS flows and the uplink QoS flows received from the UE. As above, this may have at best limited impact, being similar to legacy handover forwarding behavior in the downlink direction, to achieve in-order delivery.

In particular, once the master node or secondary node decides to offload a QoS flow to another node, during a preparation phase the corresponding uplink forwarding tunnel is established between master and secondary nodes (from the source to the target). The tunnel may be used to transport the (offloaded) uplink QoS flows received from the UE at the source node to the target node. The source node may also generate a GTP-U end marker, which is sent to the target node in response to reception by the source node of an end-marker SDAP PDU from the UE in the old DRB. Note that although the forwarding tunnel may be established, whether to forward QoS flow packets to the target node may be left up to the source node implementation. This may work even if the source node is only able to send a GTP-U end marker over the tunnel upon receiving an end-marker SDAP PDU from the UE, after uploading all QoS flow stream at the source node to the UPF.

Differentiation of whether to guarantee uplink in-order PDU delivery between source node and target node for an offloaded QoS flow may moreover be automatically achieved by the uplink forwarding tunnel establishment process. This may be similar to legacy handover forwarding in the downlink direction; the source node may propose forwarding (when uplink in-order delivery is desired for a to-be-offloaded QoS flow), and the target node accepts and replies the forwarding transport network layer (TNL).

In one implementation, the Data Forwarding Request List used by 3GPP TS 38.423, which contains information from a source NG-RAN node regarding per QoS flow proposed data forwarding, can be as follows:

| IE/Group Name | Presence | Range | IE type and reference | Semantics description | Criticality | Assigned Criticality |
|---|---|---|---|---|---|---|
| QoS Flows To Be Forwarded List | | 1 | | | | — |
| >QoS Flows To Be Forwarded Item | | 1 . . . <maxnoofQoSFlows> | | | | — |
| >>QoS Flow Indicator | M | | 9.2.3.10 | | | — |
| >>DL Data Forwarding | M | | 9.2.3.34 | | | — |
| >>UL Data Forwarding for in-order delivery of QoS offloading | o | | UL Forwarding | | | — |
| Source DRB to QoS Flow Mapping List | o | | DRB to QoS Flow Mapping List 9.2.1.15 | | | — |

29.281 GTP-U specification. While this may have at best limited impact on the UE and achieve in-order delivery without service interruption, new UPF functionality may be added.

In some embodiments, the source node may forward the offloaded uplink QoS flows received from the UE via an uplink forwarding tunnel to the target node. The uplink QoS flows may contain an end-marker at the end. This permits the target node to guarantee in-order delivery between the

| Range bound | Explanation |
|---|---|
| maxnoofQoSFlows | Maximum no. of QoS flows allowed within one PDU session. Value is 64. |

The UL forwarding information element (IE) (the above UL Data Forwarding for in-order delivery of QoS offloading) may be:

| Name IE/Group | Presence | Range | IE type and reference | Semantics description |
|---|---|---|---|---|
| UL Forwarding | M | | ENUMERATED (UL forwarding proposed, . . . ) | |

The Data Forwarding Info From Target NG-RAN node IE may contain TNL information for the establishment of a PDU session uplink data forwarding tunnel between the source NG-RAN node and the target NG-RAN node. This IE may be:

| IE/Group Name | Presence | Range | IE type and reference | Semantics description | Criticality | Assigned Criticality |
|---|---|---|---|---|---|---|
| PDU Session level DL data forwarding UP TNL Information | o | | UP Transport Layer Information 9.2.3.30 | To forward NG-U DL data to the target node for which no PDCP SN has been assigned yet. | — | |
| PDU Session level UL data forwarding UP TNL Information | o | | UP Transport Layer Information 9.2.3.30 | To forward UL SOAP SDU to the target node for in-order delivery of QoS offloading | | |
| Data Forwarding Response DRB List | | 0 . . . 1 | | | — | |
| >Data Forwarding Response DRB Item | | 1 . . . <maxno ofDRBs> | | | — | |
| >>DRB ID | M | | 9.2.3.33 | | — | |
| >>DL Forwarding UP TNL Information | o | | UP Transport Layer Information 9.2.3.30 | | — | |
| >>UL Forwarding UP TNL Information | o | | UP Transport Layer Information 9.2.3.30 | | — | |

| Range bound | Explanation |
|---|---|
| maxnoofDRBs | Maximum no. of DRBs. Value is 32. |

Figure 4:
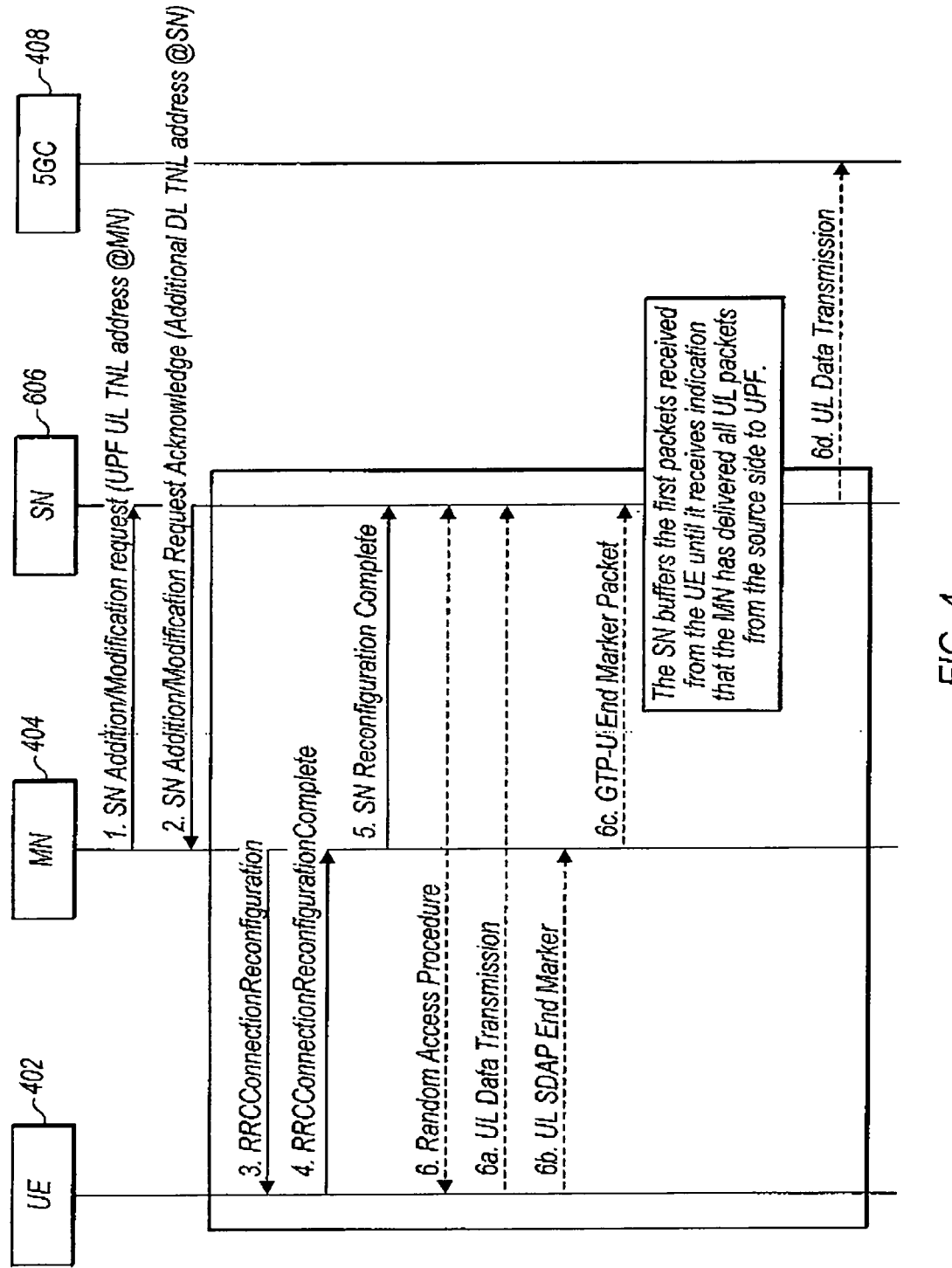
FIG. 4 illustrates an example of QoS flows offloading from a master node (MN) to a secondary node (SN) in accordance with some embodiments.

FIG. 4 illustrates an example of QoS flows offloading from a MN to a SN in accordance with some embodiments. As shown, in FIG. 4, when the MN 404 decides to split the PDU session of the UE 402 into more than one NG-U tunnel, the MN 404 may send an SN Addition/Modification Request message including a UPF uplink tunnel endpoint identifier (TEID) address used by the MN 404 to the SN 406.

As shown in FIG. 4, the MN 404 may decide to split the PDU session, the MN 404 may use a SN Addition procedure or SN modification procedure, including a current UPF UL NG-U tunnel used at the MN 404. If in-order delivery is to be used for some of the QoS flows, UL forwarding tunnels may be set up at this stage. In particular, the SN Addition/modification request may transmit a Data Forwarding Request List that may contain the UL Data Forwarding for in-order delivery of QoS offloading IE (the UL forwarding IE). The SN Addition/modification response may then contain the PDU Session level UL data forwarding UP TNL Information IE with the UL TEID.

The MN 404 may send to the UE 402 an RRCConnectionReconfiguration request to transfer uplink QoS flow data from the MN 404 to the SN 406. The UE 402 may in response send to the MN 404 an RRCConnectionReconfigurationComplete message. The MN 404 may send to the SN 406 an SN Reconfiguration Complete message to indicate that the uplink QoS flow packets are to be transferred to the SN 406. The UE 402 may or may not engage in a random access procedure with the SN 406 before sending the next set of uplink QoS flow packets to the SN 406.

If in-order delivery is to be used, the UE 402 may transmit uplink QoS flow packets to the SN 406 and may also (re)send uplink QoS flow packets to the MN 404, indicating the final uplink QoS flow packet sent to the MN 404 using an UL SDAP end marker. The SN 406 may buffer the first packets received from the UE 402 for the indicated QoS flow until the SN 406 receives GTP-U end marker packets over the UL forwarding tunnel indicating that the MN 404 has delivered all UL packets from the source side to the UPF of the 5GC 408 for that QoS flow. The SN 406 may then start delivering UL packets to the UPF of the 5GC 408 for that QoS flow using the UPF UL TEID address used at the MN 404.

Figure 5:
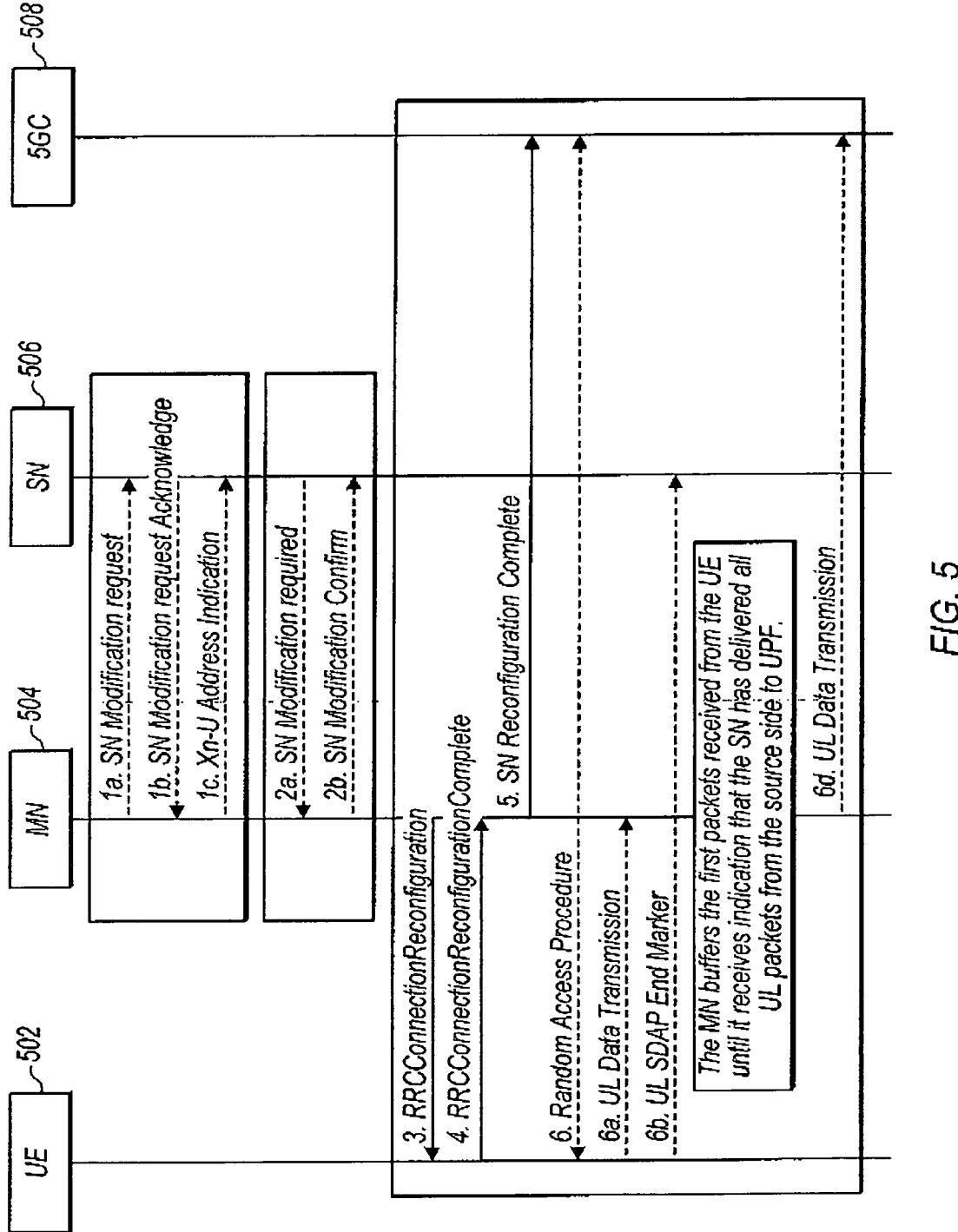
FIG. 5 illustrates an example of QoS flows offloading from a SN to a MN in accordance with some embodiments.

FIG. 5 illustrates an example of QoS flows offloading from a SN to a MN in accordance with some embodiments. Similar to the above, when some QoS flows are offloaded from the SN 506 to the MN 504, the MN 504 may decide to split the PDU session into more than one NG-U tunnel. If the MN 504 requests to offload one or more QoS flows from the SN 506, the MN 504 may send an SN Modification Request message to the SN 506. If in-order delivery is to be used for some of the QoS flows, UL forwarding tunnels may be set up via the inclusion of the above Data Forwarding Request List IE in an SN Modification Request Acknowledge message. The MN 504 may provide UL forwarding tunnels address information in the Xn-U Address Indication message.

If the SN 506 requests to offload one or more QoS flows, the SN 506 may send the SN Modification Required message to the MN 504. UL forwarding tunnels may be setup similar to the above and the MN 504 may provide the UL forwarding tunnels address information in the SN Modification Confirm message. Thus, independent of whether the MN 504 or the SN 506 initiates the QoS flow relocation, it is the target node that supplies the UPF uplink TEID address to the source node.

Similar to the above, the MN 504 may send to the UE 502 an RRCConnectionReconfiguration message to transfer uplink QoS flow data from the SN 506 to the MN 504. The UE 502 may in response send to the MN 504 an RRCConnectionReconfigurationComplete message. The MN 504 may send to the SN 506 an SN Reconfiguration Complete message to indicate that the uplink QoS flow packets are to be transferred to the MN 504. The UE 502 may or may not engage in a random access procedure with the SN 506 before sending the next set of uplink QoS flow packets to the SN 506.

If in-order delivery is to be used, the UE 502 may transmit uplink QoS flow packets to the MN 504 and may also (re)send uplink QoS flow packets to the SN 506, indicating the final uplink QoS flow packet sent to the SN 506 using an UL SDAP end marker. The MN 504 may buffer the first packets received from the UE 502 for the indicated QoS flow until the MN 504 receives GTP-U end marker packets over the UL forwarding tunnel indicating that the SN 506 has delivered all UL packets from the source side to the UPF of the 5GC 508 for that QoS flow. The MN 504 may then start delivering UL packets to the UPF of the 5GC 508 for that QoS flow.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. A method, comprising:
   establishing, at a first Next Generation (NG) radio access network (RAN) node, an uplink forwarding tunnel with a target node using transport network layer (TNL) information exchanged via an Xn application protocol (XnAP) procedure after a determination is made to offload a quality of service (QoS) flow of a user equipment (UE) to the target node, including encoding, for transmission to the target node, an XnAP message that includes a data forwarding information element proposing uplink forwarding for the QoS flow and receiving, from the target node and in response to the XnAP message, PDU-session-level uplink data-forwarding user-plane TNL information including a tunnel endpoint identifier (TEID) of the target node;
   forwarding uplink packets received from the UE of the QoS flow to the target node via the uplink forwarding tunnel;
   decoding an end marker Service Data Adaptation Protocol (SDAP) packet data unit (PDU) from the UE; and
   in response to reception of the end marker SDAP PDU from the UE, generating a General Packet Radio Service Tunneling Protocol-User Plane (GTP-U) end marker packet that indicates completion of uplink packet forwarding for the QoS flow from the first NG-RAN node to the target node for transmission to the target node via the uplink forwarding tunnel.

2. The method of claim 1, further comprising:
   determining to offload the QoS flow of the UE to the target node, wherein the target node is a secondary node (SN); and
   indicating offloading of the QoS flow to the target node.

3. The method of claim 2, further comprising:
   comprises a Data Forwarding and Offloading Info from source node information element (IE) that contains an uplink (UL) forwarding IE; and
   in response to transmission of the SN addition request or SN modification request, decoding from the SN a Data Forwarding Info from target node IE that comprises a PDU Session level UL data forwarding user plane (UP) tunnel TNL information element that contains a tunnel endpoint identifier (TEID) address of the target node.

4. The method of claim 1, further comprising:
   determining to offload the QoS flow of the UE to the target node based on an indication from the target node.

5. The method of claim 4, further comprising:
   from the target node, a secondary node (SN) modification request to offload the QoS flow to the target node, in response to reception of the SN modification request;
   encoding for transmission to the target node, an SN modification request acknowledge message that comprises a Data Forwarding and Offloading Info from source node information element (IE) that contains an uplink (UL) forwarding IE; and
   in response to transmission of the SN modification request acknowledge message, decoding, from the target node, a Data Forwarding Info from target node IE that comprises a PDU Session level UL data forwarding user plane (UP) tunnel (TNL) information element that contains a tunnel endpoint identifier (TEID) address of the target node.

6. The method of claim 1, encoding for transmission to the target node, a secondary node (SN) modification required message that comprises a Data Forwarding and Offloading Info from source node information element (IE) that contains an uplink (UL) forwarding IE; and
   in response to transmission of the SN modification required message, decoding from the target node a Data Forwarding Info from target node IE that comprises a PDU Session level UL data forwarding user plane (UP) tunnel TNL information element that contains a tunnel endpoint identifier (TEID) address of the target node.

7. The method of claim 1,
wherein forwarding uplink packets of the QoS flow to the target node comprises forwarding uplink packets received at the first NG-RAN node prior to reception of the end marker SDAP PDU, and wherein uplink packets of the QoS flow received after the end marker SDAP PDU are not forwarded via the uplink forwarding tunnel.

8. The method of claim 1,
wherein the uplink forwarding tunnel is established on a per-QoS-flow basis within a PDU session, and wherein uplink packets associated with different QoS flows of the PDU session are forwarded via different uplink forwarding tunnels or are not forwarded.

9. An apparatus, comprising:
a memory; and
processing circuitry in communication with the memory, wherein the processing circuitry is configured to:
establish, at a first Next Generation (NG) radio access network (RAN) node, an uplink forwarding tunnel with a target node using transport network layer (TNL) information exchanged via an Xn application protocol (XnAP) procedure after a determination is made to offload a quality of service (QoS) flow of a user equipment (UE) to the target node, including encoding, for transmission to the target node, an XnAP message that includes a data forwarding information element proposing uplink forwarding for the QoS flow and receiving, from the target node and in response to the XnAP message, PDU-session-level uplink data-forwarding user-plane TNL information including a tunnel endpoint identifier (TEID) of the target node;
buffer packets associated with the QoS flow received from the UE after establishment of the uplink forwarding tunnel;
decode a General Packet Radio Service Tunneling Protocol-User Plane (GTP-U) end marker packet received from the source node via the uplink forwarding tunnel; and
in response to reception of the GTP-U end marker packet from the source node via the uplink forwarding tunnel, encode the buffered packets for transmission to a 5th Generation (5G) core network.

10. The apparatus of claim 9,
wherein the processing circuitry is further configured to decode an indication from the source node to offload the QoS flow of the UE to the target node, wherein the target node is a secondary node (SN).

11. The apparatus of claim 10,
wherein the processing circuitry is further configured to:
decode, from the source node, an SN addition request or an SN modification request that comprises a Data Forwarding and Offloading Info from source node information element (IE) that contains an uplink (UL) forwarding IE; and
in response to reception of the SN addition request or SN modification request, encode, for transmission to the source node, a Data Forwarding Info from target node IE that comprises a PDU Session level UL data forwarding user plane (UP) tunnel (TNL) information element that contains a tunnel endpoint identifier (TEID) address of the target node.

12. The apparatus of claim 9,
wherein the source node is a secondary node (SN).

13. The apparatus of claim 12,
wherein the processing circuitry is further configured to determine to offload the QoS flow of the UE to the target node.

14. The apparatus of claim 13,
wherein the processing circuitry is further configured to:
encode, for transmission to the SN, an SN modification request to offload the QoS flow of the UE to the target node;
in response to transmission of the SN modification request, decode from the SN, an SN modification request acknowledge message that comprises a Data Forwarding and Offloading Info from source node information element (IE) that contains an uplink (UL) forwarding IE; and
in response to reception of the SN modification request acknowledge message, encode for transmission to the SN a Data Forwarding Info from target node IE that comprises a PDU Session level UL data forwarding user plane (UP) tunnel TNL information element that contains a tunnel endpoint identifier (TEID) address of the target node.

15. The apparatus of claim 12,
wherein the processing circuitry is further configured to decode an indication from the SN to offload the QoS flow of the UE to the SN.

16. The apparatus of claim 15,
wherein the processing circuitry is further configured to:
decode, from the SN, a SN modification required message that comprises a Data Forwarding and Offloading Info from source node information element (IE) that contains an uplink (UL) forwarding IE; and
in response to reception of the SN modification required message, encode for transmission to the SN a Data Forwarding Info from target node IE that comprises a PDU Session level UL data forwarding user plane (UP) tunnel TNL information element that contains a tunnel endpoint identifier (TEID) address of the target node.

17. A non-transitory computer-readable storage medium that stores instructions for execution by one or more processors to:
establish, at a first Next Generation (NG) radio access network (RAN) node, an uplink forwarding tunnel with a target node using transport network layer (TNL) information exchanged via an Xn application protocol (XnAP) procedure after a determination is made to offload a quality of service (QoS) flow of a user equipment (UE) to the target node, including encoding, for transmission to the target node, an XnAP message that includes a data forwarding information element proposing uplink forwarding for the QoS flow and receiving, from the target node and in response to the XnAP message, PDU-session-level uplink data-forwarding user-plane TNL information including a tunnel endpoint identifier (TEID) of the target node;
forward uplink packets received from the UE of the QoS flow to the target node via the uplink forwarding tunnel;
decode an end marker Service Data Adaptation Protocol (SDAP) packet data unit (PDU) from the UE; and
in response to reception of the end marker SDAP PDU from the UE, generate a General Packet Radio Service Tunneling Protocol-User Plane (GTP-U) end marker packet for that indicates completion of uplink packet forwarding for the QoS flow from the first NG-RAN node to the target node transmission to the target node via the uplink forwarding tunnel.

18. The non-transitory computer-readable storage medium of claim 17, wherein the instructions are further executable by the one or more processors to:

determine to offload the QoS flow of the UE to the target node, wherein the target node is a secondary node (SN); and indicate offloading of the QoS flow to the target node.

19. The non-transitory computer-readable storage medium of claim 17, wherein the instructions are further executable by the one or more processors to:

determine to offload the QoS flow of the UE to the target node based on an indication from the target node;

decode, from the target node, a secondary node (SN) modification request to offload the QoS flow to the target node, in response to reception of the SN modification request;

encode for transmission to the target node, an SN modification request acknowledge message that comprises a Data Forwarding and Offloading Info from source node information element (IE) that contains an uplink (UL) forwarding IE; and in response to transmission of the SN modification request acknowledge message, decode from the target node a Data Forwarding Info from target node IE that comprises a PDU Session level UL data forwarding user plane (UP) tunnel (TNL) information element that contains a tunnel endpoint identifier (TEID) address of the target node.

20. The non-transitory computer readable storage medium of claim 17, wherein the instructions are further executable by one or more processors to cause the target node to:

buffer uplink packets received via the uplink forwarding tunnel until the GTP-U end marker packet is received; and forward the buffered uplink packets toward the 5G core network only after reception of the GTP-U end marker packet.

\*   \*   \*   \*   \*